Oct. 10, 1967 S. E. AVEY 3,346,796
DC ENERGIZED CONSTANT SPEED DRIVE FOR AN AC MOTOR
Original Filed Nov. 7, 1963
3 Sheets-Sheet 1

INVENTOR.
SPENCER E. AVEY
BY
ATTORNEY

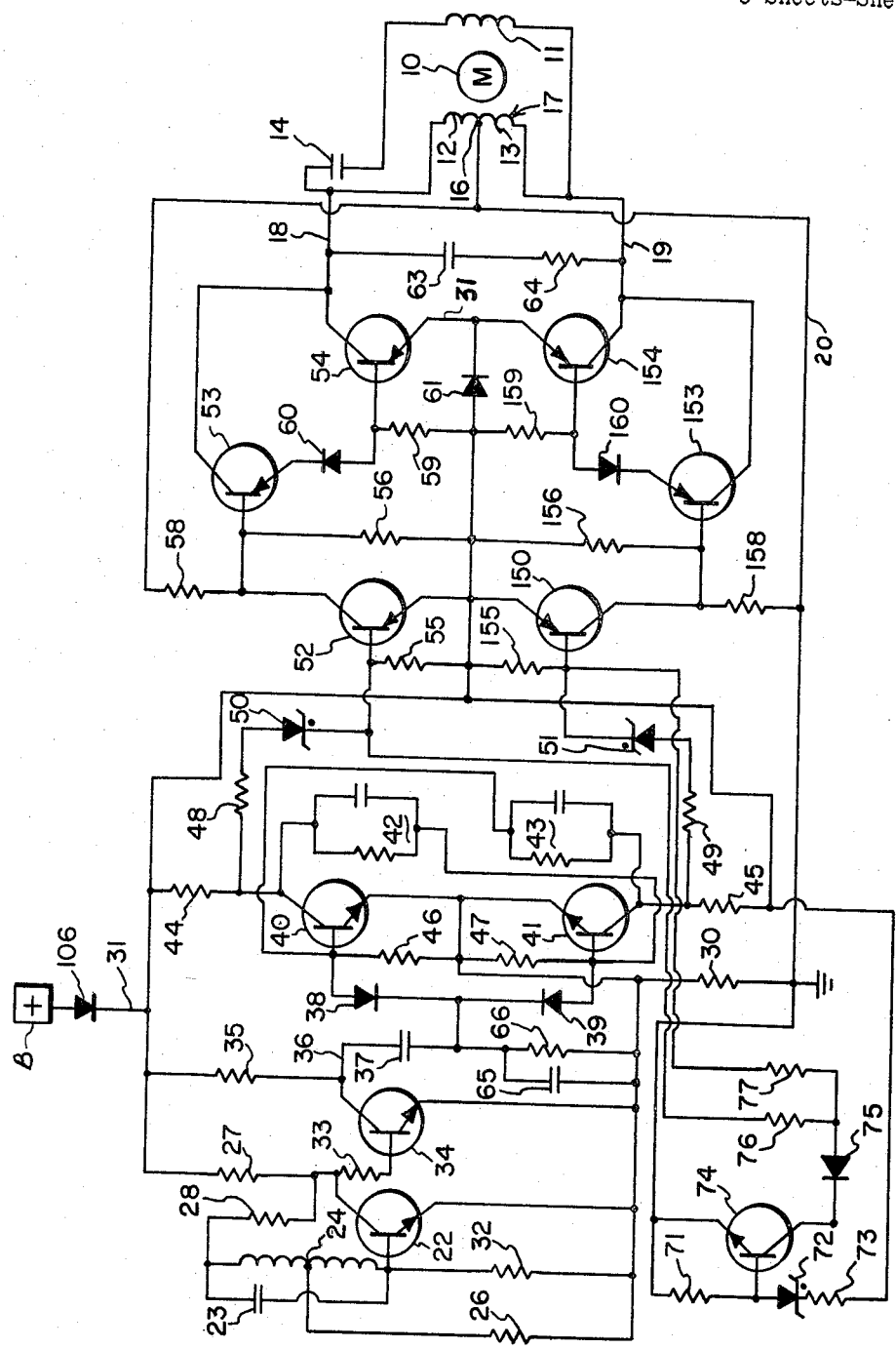

United States Patent Office 3,346,796
Patented Oct. 10, 1967

3,346,796
DC ENERGIZED CONSTANT SPEED DRIVE
FOR AN AC MOTOR
Spencer E. Avey, Kettering, Ohio, assignor, by mesne assignments, to TRW Inc., Cleveland, Ohio, a corporation of Ohio
Continuation of application Ser. No. 322,191, Nov. 7, 1963. This application Sept. 13, 1966, Ser. No. 579,800
18 Claims. (Cl. 318—341)

ABSTRACT OF THE DISCLOSURE

A constant speed control system for subfractional H.P. AC motors in which a frequency oscillator energizes a pair of amplifiers through pulse shaping and frequency dividing networks. The amplifiers are self-saturating during conduction and cut-off during non-conduction. The output of the amplifiers are in opposition to alternately supply uniform waveshape DC impulses of opposite polarity. The motor has a pair of energizing windings, one of which is center tapped and each half alternately receives the output pulses from said amplifiers. Each amplifier includes a pair of output transistors arranged in cascade to provide maximum gain, i.e., the two collector electrodes are connected together and the base of the forward transistor is connected to the emitter of the other output transistor. In this manner the said output transistors have a greater short circuit forward current amplification factor than that of either single transistor, and the transistors are self-balancing, i.e., drawing only sufficient current to saturate the forward transistor of said pair. Line voltage transients are prevented from energizing the motor windings by a Zener diode-transistor switch which clamps the bases of the amplifier input transistors to B+ so as to momentarily turn off the amplifier output.

---

Figure 1:
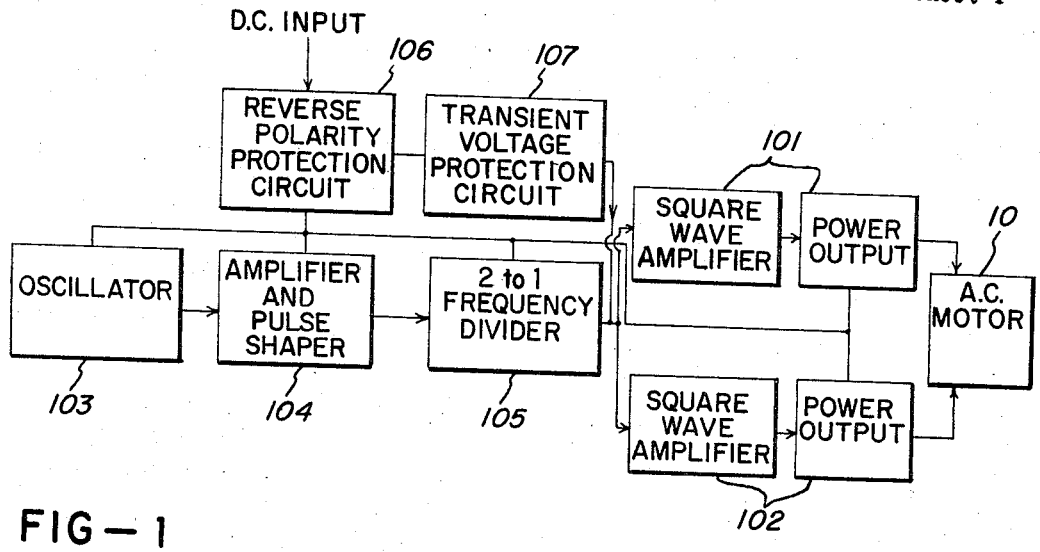

This application is a continuation of application Ser. No. 322,191 filed Nov. 7, 1963.

This invention generally relates to improvements in motor speed control systems for subfractional horsepower alternating current motors, and more particularly to improved direct current energized systems for driving subfractional horsepower alternating current motors at constant speeds despite variations in direct current voltage, temperature, or variable loads imposed upon the motor.

In many applications requiring constant speed motor drives wherein only direct current energization is available or preferred, the use of direct current motors is objectionable due to the fact that the brushes and commutators require frequent servicing as well as producing arcing and radio noise. Where the motor drive is to be used at high altitudes and under varying environments of temperature and humidity the brushes and commutators are particularly troublesome and result in erractic operation of the motor as well as interfering with the operation of radio equipment in the vicinity.

The substitution of alternating current motors for these applications, on the other hand, has generally been found uneconomical due to the fact that available control systems for driving alternating current motors from a direct current source have usually been more complex and expensive than desired as well as requiring more space and weight than desired for many fractional horsepower applications, particularly for use on aircraft or like applications.

According to the present invention, there is provided an improved control system that is particularly useful for small subfractional horsepower alternating current motor applications and that is capable of maintaining the motor speed substantially constant within a range of ±½%, or better, of the rated speed of the motor, despite changes in the altitude, temperature, and other environmental conditions. The preferred system employs a minimum number of components, preferably all being solid state components such as transistors and diodes, and consequently the control system may be constructed in small, lightweight packages that are as small as or smaller than comparable control systems for direct current motors. Additionally, the preferred system is relatively insensitive to wide variations in the direct current energizing source, as well as in ambient temperature and altitude, and operates to maintain the motor speed substantially constant despite these variables.

It is accordingly a principal object of the invention to produce a small lightweight, and inexpensive constant speed motor control system that is particularly useful for subfractional horsepower alternating current motors energized by a direct current source.

A further object is to provide such a system that is relatively insensitive to changes in the voltage of the direct current energizing source, or changes in ambient temperature and loading over a wide range.

Still another object is to provide such a system that is comprised exclusively of solid state components occupying a very small volume and lightweight.

A still further object is to provide such a system capable of driving such a motor at a very constant speed within ±½% of its rated speed despite wide range changes in the energizing direct current voltage, or in the ambient temperature or load.

Figure 4:
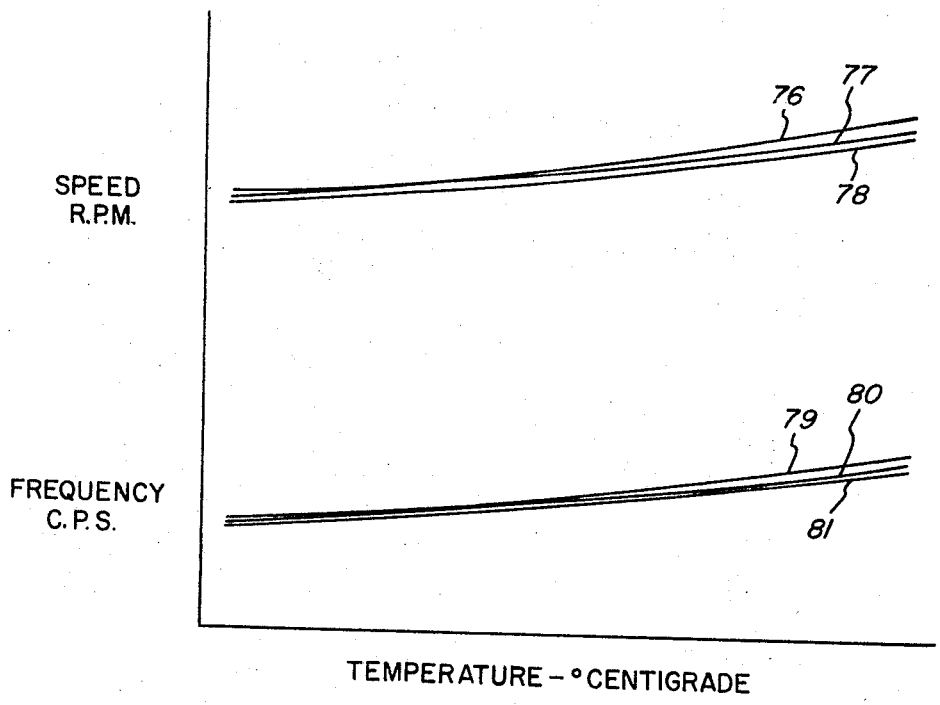
Figure 3:
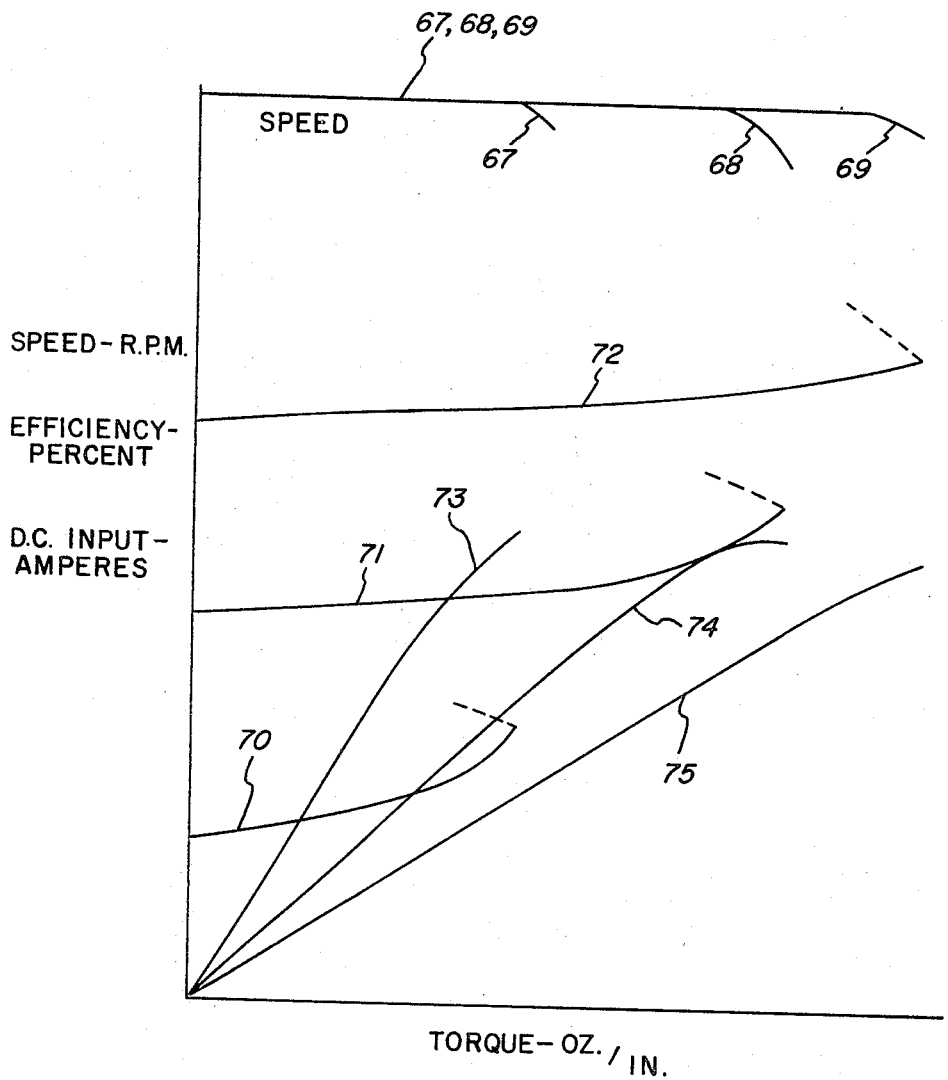

Other objects and many additional advantages will be more readily understood by those skilled in the art after a detailed consideration of the following specification taken with the accompanying drawings wherein:

FIGURE 1 is a block diagram illustrating one form of constant speed motor control system according to the invention;

FIGURE 2 is an electrical schematic drawing illustrating one preferred constant speed motor control system according to the invention, FIGURE 3 is a series of plotted curves illustrating the constancy of the speed and motor current despite changes in the load being applied to the motor, together with the efficiency of the motor control system with differing loads, and FIGURE 4 is a series of plotted curves illustrating constant speed characteristics of the motor and control system with variation in temperature over a wide range of temperature changes.

With reference to FIGURE 1, the present invention generally comprises a pair of direct current power amplifiers 101 and 102 that are connected in opposition to a center tapped winding of an alternating current motor 10, and accordingly apply direct current power impulses oppositely through different halves of the motor winding. These direct current amplifiers are self-saturating during conduction and abruptly cut off during nonconduction thereby to transmit impulses having a constant frequency despite changes in the load or changes in other ambient conditions. These direct current amplifiers are energized in alternation by means of a highly stable frequency oscillator 103, that is relatively insensitive to variations in the direct current energizing source or in ambient conditions. The oscillator output energizes a flip-flop circuit consisting of the pulse shaper 104 and frequency divider 105. As a result, the alternating current motor winding receives direct current energization, but in the form of alternately produced impulses of constant wave-shape and frequency, which are produced in opposite directions through the alternating current motor windings. Protection against improper polarity input to the system is provided by a reverse polarity protection circuit 106; and the system is further stabilized against high voltage transients by a transient voltage protection circuit 107.

Referring now to FIGURE 2 for detailed consideration of one preferred embodiment of the invention, there is shown at the right a motor 10 which may be a subfractional horsepower alternating current motor, preferably of the hysteresis synchronous type, having a pair of windings 11 and 17, that are interconnected in parallel, but adapted to receive energization in phase displaced arrangement for driving the motor by means of a series capacitor 14 being connected in series with the motor winding 11.

According to the invention, these alternating current windings of the motor are adapted to be energized by a pair of direct current amplifiers being connected in opposition, and operating in alternation, to each supply uniform waveshape direct current impulses of constant frequency produced by a flip-flop circuit and directed oppositely through the motor windings. More specifically, a first direct current amplifier transmits a series of uniform waveshape impulses over line 18, which pass through the upper half 12 of the motor winding 17, and through the winding center tap 16 to ground return line 20; and a second direct current amplifier transmits a series of uniform direct current impulses over line 19 and through the lower half 13 of the motor winding 17 to the center tap 16 to the same ground return path 20. These two series of direct current impulses are alternately produced in sequence so that the motor 10 receives an alternating current flux through the different halves 12 and 13 of the motor winding 17, to drive the motor at the frequency determined by the repetition rate of the direct current impulses.

The second motor winding 11 is connected across the lines 18 and 19 and in series with capacitor 14, and, accordingly, both series of pulses travel oppositely through the winding 11. The series capacitor 14 phase displaces these direct current impulses through the winding 11 from those received through the winding 17, thereby to exert a rotating torque upon the motor 10 in a manner well known to those skilled in the art.

For accurately controlling the frequency and period of these uniform direct current impulses, the circuit includes an alternating current oscillator stage comprising a transistor 22 and a resonant circuit including a capacitor 23 and inductor 24, being interconnected between the collector, base and emitter electrodes of transistor 22. If desired, a tuning fork circuit or an R-C oscillator circuit may be employed instead of the oscillator shown.

In operation, the oscillator stage receives direct current energization from a battery or other direct current source B (e.g., which may be a rectified AC supply of any desired frequency) over line 31 and through a return resistor 30, which voltage is applied between the collector and emitter electrodes of transistor 22 through a current limiting resistor 27. Prevention of improper polarity DC entering the system is provided by the diode 106. The direct current potential is also applied to bias the base electrode of transistor 22 by means of resistors 28, 26 and 32, which interconnect the capacitor 23 inductor 24 resonant circuit between the collector electrode of transistor 22 and the ground return path. It will be noted that the resistor 28 connects the upper terminal of the resonant circuit to the collector electrode of transistor 22, and the resistor 32 connects the lower terminal of this resonant circuit to the resistor 30 leading to the direct current return path. Consequently, current may flow through the resistors 27 and 28 and the inductor 24, and thence through the resistors 32 and 30 to the direct current return path. Additionally, the resistor 26 interconnects the center tap of the inductor 24 with the resistor 30 leading to the direct current return path. The upper terminal of resistor 32 is directly connected to the base electrode of transistor 22 and provides a direct current biasing on this base electrode.

The frequency of this oscillator stage is very accurately controlled by the resonant frequency of the tank circuit, including capacitor 23 and inductor 24, and the biasing provided by resistor 26. Wide variations in the amplitude of the direct current voltage or in the temperature accordingly do not affect the frequency of operation of this stage, since the temperature coefficient of the inductor 24 and capacitor 23, and the Q of the resonant circuit are such as to provide stability with temperature and voltage changes.

The biasing on the transistor 22 is designed to cut off conduction through the transistor 22 during portions of the negative half cycles of the alterations produced by the resonant circuit, and thereby provide a clipping of the peaks of the negative half cycles. Thus, at the output of this first stage appearing at the collector electrode of transistor 22, the circuit provides an alternating current of constant frequency having the peaks of the negative half cycles thereof being clipped.

The output of this first stage oscillator is directed through a resistor 33 and directly coupled to the base electrode of transistor 34 that functions in this case as a current amplifier, to provide at its output collector electrode a signal of constant frequency. The second stage transistor 34 is directly coupled to the output of the first stage through resistor 33 leading to its base electrode, and receiving direct current energization through resistor 35 leading to its collector electrode. This direct current coupling through resistor 33 provides a positive bias at the base of transistor 34. The transistor 34 operates in its amplifying range such that it is driven in synchronism in response to alternation of the oscillator, producing current amplification and an output signal at its collector electrode and over output line 36.

This output signal from amplifier 34 is directed through a coupling capacitor 37 to a pair of oppositely poled diodes 38 and 39 leading to the dual inputs of a flip-flop stage, including feedback connected transistors 40 and 41. Due to the oppositely poled polarity of the diodes 38 and 39, the flip-flop stage responds only to negative going impulses received from the amplifier 34, and therefore divides the frequency of the oscillator circuit by one-half. Thus, if the oscillator stage operates at a constant frequency of 800 cycles per second, the flip-flop operates at a constant rate of 400 cycles per second.

The flip-flop stage includes a pair of transistors 40 and 41 interconnected in common emitter configuration and in mutual feedback with one another by means of a pair of resistance-capacity networks 42 and 43, respectively. Network 42 interconnects the collector electrode of transistor 40 with the base electrode of transistor 41, and network 43 interconnects the collector electrode of transistor 41 in feedback with the base electrode of transistor 40. The collector electrodes of transistors 40 and 41 receive direct current energization through the resistors 44 and 45, respectively, each of which has one terminal connected to the direct current source over line 31 and the opposite terminal thereof connected to the electrode of a different one of the transistors 40 and 41. The base electrodes of both transistors 40 and 41 also receive direct current biasing by means of the resistors 46 and 47 that are interconnected and have their common junction being connected to the ground return resistor 30 and to the emitter electrodes of both transistors 40 and 41, as shown.

The flip-flop circuit stage functions to produce square waveshape impulses over its output lines and through current limiting resistors 48 and 49, respectively, each leading to a Zener diode 50 and 51, respectively. The current limiting resistor 48 and Zener diode 50 interconnect the output of flip-flop transistor 40 with a first direct current amplifier stage, and serve to prevent voltage that appears across resistor 44 from appearing in the following stages during an "off" condition of transistor 40, since transistor 40 in a condition of saturation still has a small voltage across its emitter-collector path. Similarly, the current limiting resistor 49 and Zener diode 51 interconnect the output of the second flip-flop transistor 41 with a second direct current amplifier, and in the same manner serve to prevent voltage that appears across resistor 45 from appearing in the following stages during an "off" condition of transistor 41. Because of changes in D.C. voltage, the square wave flowing from Zener diodes 50 and 51 is of non-uniform amplitude.

The square waveshape signal being produced at the flip-flop transistor 40, and passing through current limiting resistor 48 and Zener diode 50 is directly coupled to a first direct current amplifier, comprising two cascaded transistors 53, 54 and the transistor 52, although three or more cascaded transistors may be employed. These amplifier transistors are normally biased in a substantially cut off condition and pass a minimum current in the absence of a pulse received from the flip-flop transistor 40, and alternatively, respond to each of the square waveshape pulses to go into a saturation or maximum current condition for the duration of each of the flip-flop pulses. When the amplifier circuit is driven into saturation, a direct current power impulse having a square waveshape is passed through the upper half 12 of the motor winding 17, over line 18 and through the transistor 54, thereby to provide a direct current power impulse through this half of the motor winding. Similarly, when the transistors are cut off, a minimum current flows through this upper half 12 of the motor winding 17.

Referring to this direct current amplifier stage, in greater detail, the first transistor 52 receives an impulse from the flip-flop transistor 40 at its base electrode, and in response thereto passes a maximum current to the base of transistor 53. A direct current voltage pulse is accordingly produced across resistor 56 which is applied to the base electrode of the second transistor 53, immediately biasing transistor 53 into a maximum current condition and providing a direct current pulse across a resistor 59 which is connected in series with the collector and emitter electrodes of transistor 53. This voltage pulse appearing across resistor 59 is applied to the third transistor 54, driving the third transistor 54 into current saturation. The collector electrode of both transistors 53 and 54 are connected in common to line 18 leading to the upper half 12 of motor winding 17 and to the upper terminal of winding 11. Consequently, the current passing through both transistors 53 and 54 is applied to the motor windings 12 and 11 so that both transistors 53 and 54 are effectively in parallel when energizing the motor windings. The transistors 53 and 54 are connected in cascade or compound connection. In order to obtain maximum gain in an amplifier, it is necessary to insure that the output transistor have a high-valued short circuit forward current amplification factor. As emitter current increases to relatively high values, the ratio of output current (collector) to input current (emitter) decreases, thus reducing the forward current amplification factor. By compound connecting the transistors 53, 54 the drop-off of collector current (or reduction in forward current amplification factor) at high emitter currents is made negligible. The compound connection is effected by connecting the base of transistor 54 to the emitter of transistor 53, and the two collectors (i.e., of transistors 53 and 54) are connected together.

To illustrate how the compound-connected transistors have a greater short circuit forward current amplification factor than that of either single transistor 53 or 54, assume that the short circuit forward current transfer ratio of each transistor=0.9, and the input current over line 31 to the emitter-base circuit of transistor 54 is represented as $I_1$. Since in a common base amplifier the collector current is equal to the emitter current multiplied by the short circuit forward current amplification factor, the collector current ($I_{C54}$) of transistor 54 is: $I_{C54}=0.9I_{31}$. Also, the base current ($I_{B54}$) of transistor 54 equals the emitter current ($I_{31}$) less the collector current, therefore $I_{B54}=I_{31}-0.9I_{31}=0.1I_{31}$. Further, the base current of transistor 54 is the emitter input current ($I_{E53}$) of transistor 53. Hence, the collector current ($I_{C53}$) of transistor 53 is: $I_{C53}=(0.9)(0.1I_{31})=0.09I_{31}$. The total output current in line 18 is equal to the sum of $I_{C53}$ plus $I_{C54}$ or $=0.9I_{31}+0.09I_{31}=0.99I_{31}$. The short circuit forward current amplification factor for the compound connection is equal to the ratio of $I_{18}/I_{31}$ or $=0.99I_{31}/I_{31}=0.99$ which represents an increase from a single transistor having factor of 0.9.

I have further found that by employing the transistors 53, 54 in a compound connection, not only will high amplification or maximum gain be accomplished, but the circuit as applied to power a motor will be more efficient, especially where varying motor load conditions are encountered. Assuming that insufficient current flows in the emitter-base path of transistor 54 to saturate it completely, then the voltage drop from the collector to the emitter of transistor 54 increases. As the latter voltage drop increases this causes the emitter of transistor 53 to draw more current from line 31, which in turn causes saturation of both transistors 53 and 54, by driving the base of transistor 54 more negative, i.e., down to the potential of the emitter of transistor 54. Furthermore, should the load on the motor 10 suddenly decrease, then the voltage across the emitter-collector path of transistor 54 will decrease. When this occurs, then the emitter of transistor 54 will draw less current from line 31, and concomitantly the emitter of transistor 53 will require less current since less is needed to drive transistor 54 into saturation. The result of such action is that with varying motor current the compound connected transistors 53, 54 are self-balancing, drawing only sufficient current to saturate transistor 54, thus making the circuit more efficient.

Greater efficiency is further attained, since if transistors 53 and 54 were directly coupled, then power normally used to drive the base of transistor 54 would be unused since it would be led to ground through a resistor as in the connection of transistor 52, for example. By employing a compound connection of transistors 53 and 54, all the power used to drive the base of transistor 54 is also sent into the motor winding, and any loss of saturation of transistor 54 caused thereby is more than offset by the use of such power in the output circuit.

In a direct current amplifier of this type, leakage currents pass through the transistors 53 and 54 and become particularly pronounced at elevated temperatures. Therefore, to maintain these transistors in the desired cut off condition before receiving pulses from the flip-flop, each of these transistors is provided with reverse biasing being supplied by the resistors 56 and 59 interconnecting the positive voltage supply line 31 to the base electrodes thereof. Additionally, the diodes 60 and 61 control the input to the emitters of transistors 53 and 54. By means of these base resistors 56 and 59 and the diodes 60 and 61, each of these transistors 53 and 54 are reversely biased by any leakage current flowing therethrough; and consequently are maintained in the cut off condition, which is desired, until receiving the square waveshape impulses from the flip-flop circuit. Thus, in response to each square waveshape pulse being produced by the upper section of the flip-flop circuit, a direct power impulse is directed to the upper half 12 of the motor winding 17 and to the winding 11.

The second half of the flip-flop circuit similarly provides square waveshape pulses through a current limiting resistor 49 and a Zener diode 51 to a second direct current amplifier stage comprising the three transistors 150, 153 and 154, which are interconnected in an analogous arrangement as the transistors 52, 53 and 54 in the first direct current amplifier stage previously described. The second direct current amplifier is connected over line 19 to energize the lower half 13 of the motor winding 17, and to apply direct current impulses thereto in alternation with the direct current impulses being applied by the upper direct current amplifier as previously described. Since the square waveshape pulses being produced by the upper and lower transistors of the flip-flop stage are produced 180° out of phase, the upper and lower direct current amplifiers are operated in alternation to produce their successive direct current power pulses to the opposite halves of the motor winding 17, and consequently produce an alternating current flux through the motor winding 17 as desired to drive the alternating current motor. The output lines 18 and 19 leading from the two stages of the direct current amplifier are also applied across the second motor winding 11 through the phase shifting capacitor 14, thereby to provide alternating direct current power pulses through the second winding 11 in an out-of-phase relationship with the energization of the first motor windings 17.

Because of the fact that there are induced voltages appearing across the emitter-collectors of transistors 54 and 154 due to the motor load connection, any large voltage transient appearing in line 31 would impose an extremely large voltage drop across such transistors of perhaps 160%–170% of that of the line voltage. This would require the use of rather expensive power output transistors. Therefore, in order to employ reasonably priced components and to prevent line transient voltages from energizing the motor windings or damaging the several components of the motor speed control system, there is provided a network comprising resistors 71 and 73 for the purpose of detecting the line voltage; the resistor 73 being connected to the input line 31 and the resistor 71 being connected to ground. When a high line voltage transient appears which exceeds the breakdown level of Zener diode 72, the transistor 74 will be driven to saturation and turned on. When transistor 74 is turned on, current will flow from line 31 through both resistors 55 and 155; then through current limiting resistors 76, 77; through diode 75; the collector-emitter path of transistor 74 and to ground. Also, when transistor 75 saturates, sufficient base current flows in transistors 52 and 150 so that they also become saturated. The base of transistors 53, 54 and 153, 154 are thereby clamped to B+ so that no output signal appears in lines 18 or 19.

During the transient time therefore, the output to lines 18, 19 is momentarily turned off, and the higher voltage is allowed to enter into the oscillator and flip-flop circuits. As soon as the transient has passed, the Zener diode 72 will again revert to a high impedance state to shut off transistor 74, thereby again turning on power to the motor.

To prevent transient signals from energizing the motor windings as these direct current amplifiers are turned on and off, there is additionally provided a network comprising a series connected capacitor 63 and resistor 64 interconnecting the output lines 18 and 19. This serves to by-pass transient voltages being produced as these amplifiers are switched, and accordingly prevents any transient voltages from energizing the motor windings.

For the purpose of isolating the oscillator stage from the alternate switching of the flip-flop stage and the direct current power amplifier stages, there is additionally provided a decoupling circuit interconnecting the output of the transistor 34 with the flip-flop stage. This decoupling circuit comprises a parallel connected capacitor 65 and resistor 66 that is provided in the input of the flip-flop stage. Consequently, upon switching of the flip-flop stage, any transients being produced at much higher frequency than the oscillations are by-passed through the capacitor 65 and prevented from being transmitted backwardly to the oscillator stage, and thereby affecting the constant frequency of operation of the oscillator.

FIGURES 3 and 4 illustrate the characteristic of a typical proposed motor speed control system of the invention under different conditions of load, energizing voltage and changes of temperature.

The upper series of curves 67, 68 and 69 illustrate that the speed of the motor is very constant over a wide range as the load imposed upon the motor is progressively increased. The curve 67 illustrates this constant speed operation when the system is energized by a direct current supply voltage of 22 volts, and shows that the speed remains substantially constant until the load has increased to the maximum that can be sustained at that voltage. By increasing the voltage, the constant speed range can be maintained for even greater loads as illustrated by curve 68 where the voltage is raised to 28 volts; and still further by increasing the direct current voltage to 32 volts.

The second family of curves 70, 71 and 72 illustrate the current being drawn from the direct current power source under the three conditions of different voltage being applied to the circuit. All three curves illustrate that the current supplied to the system gradually increases as the load is increased over the constant speed ranges, with the current being drawn for each voltage being in proportion to the voltage applied.

The three remaining curves of FIGURE 3 illustrates the varying efficiency of the motor control system when energized by the three different direct current voltage supplies and the manner in which these efficiencies vary with the load applied. The first curve 73 shows the efficiency for the circuit to be greatest over its constant speed of operation when the circuit is energized by a 22 volt direct current source and that the efficiency increases as the load is increased, as would be expected since the system is operating more efficiently at higher loads. The second and third curves 74 and 75 are similar to the first curve 73, in characteristics, but show a decreasing efficiency when the motor control system is energized by progressively higher voltage sources.

It is to be particularly noted that despite the increasing loads being applied to the motor under all three different direct current voltages, the speed control being provided by the circuit is substantially constant over a wide range despite variations in the load.

FIGURE 4 illustrates the constant speed characteristics of the motor control system despite changes in temperature over a wide range from about −50° centigrade to 75° centigrade. As shown by the upper family of three curves 76, 77 and 78, an increase in the temperature over this wide range does not produce an appreciable increase in the speed, since the speed increase is less than 50 r.p.m. when the motor is operating at a speed of about 12,000 r.p.m. The upper curve 76 illustrates the characteristics of the motor when the system is energized by a direct current voltage of 22 volts; the middle curve 77 is quite similar and illustrates essentially the same characteristics when the motor is energized by 28 volts of direct current; and the lower curve 78 illustrates the same characteristics of the motor when energized by a direct current voltage of 32 volts.

The lower family of curves 79, 80 and 81 illustrates the variation in frequency of the oscillator stage as the temperatures vary over this same range of temperatures. As shown, this characteristic is substantially identical with the speed characteristics of curves 76, 77 and 78, as would be expected.

The upper curve 79 illustrates the constancy of the frequency when the system is energized by 22 volts, and it is noted that the frequency of the oscillator stage changes less than two cycles per second as the temperatures varies from about −50° C. to 75° C. The second and third curves 80 and 81 indicating energization at 28 and 32 volts, respectively, similarly show that the frequency characteristic of the oscillator stage is substantially unaffected by the changes in the direct current voltage being applied to the circuit.

Although but one preferred embodiment of the invention has been illustrated and described, it is believed evident that many changes may be made by those skilled in the art without departing from the spirit and scope of this invention. Accordingly, this invention is to be considered as being limited only by the following claims.

What I claim is:

1. A constant speed direct current energized drive for an alternating current motor having at least one energizing winding comprising:
   a pair of direct current power impulse producing circuits connected to opposite terminals of said winding of the motor and having a common return path connectable to an intermediate tap on the said motor winding,
   and means for alternately triggering said pair of impulse producing circuits into operating at a constant rate,
   said triggering means including a constant frequency oscillator and a flip-flop switching circuit energized by the oscillator and producing a pair of opposite polarity output signals,
   and means connecting each of said output signals to trigger a different one of the direct current power impulse producing circuits in synchronism therewith.

2. A constant speed direct current energized drive for an alternating current motor having at least one energizing winding comprising, in combination:
   a constant frequency oscillator energizable by a direct current source for producing a pair of constant frequency signals of opposite phase;
   means including a direct current power amplifier interconnected to receive said constant frequency signals for producing a series of direct current impulses having a square waveshape;
   conductor means coupling said direct current amplifier to energize said motor winding;
   said power amplifier including a pair of transistors in parallel compound connection whereby conduction of one of the transistors energizes the second in conduction, and means interconnecting said transistors to jointly apply direct current impulses to said conductor means.

3. In a constant speed motor control system for alternating current motors having an energizing winding and being energized by a direct current source,
   a pair of direct current power amplifiers each connected to apply direct current power impulses in opposition to the energizing winding of said motor,
   said amplifiers comprising at least two cascaded output transistors being directly coupled together, with the output of the preceding transistor controlling the conduction of the succeeding transistor, and means coupling the output of the said two of said transistors to commonly apply power impulses to the said motor winding, whereby said last succeeding transistor is regulated by its preceding transistor but has its output in parallel with that of the preceding transistor.

4. In the motor control system of claim 3, the addition of means for degeneratively biasing said transistors for compensation against variations in leakage current at elevated temperatures.

5. A constant speed direct current drive for alternating current motors having a pair of windings adapted to be energized in an out-of-phase relationship, comprising:
   means energizable by a direct current source for producing two series of square waveshape signals in alternation,
   a direct current amplifier means interconnected to receive said two series of signals to produce two alternate series of direct current power impulses at a frequency controlled by the two series of signals,
   means coupling each series of direct current power impulses to energize the motor windings in an opposite direction from the other series,
   a decoupling circuit interconnecting the square waveshape signal producing means and the direct current amplifier means to prevent transmission of spurious voltages appearing at the output of the former means,
   said coupling means further including a transient isolating circuit interconnecting said series of direct current power impulses and said motor windings to prevent undesired transients from energizing the motor windings,
   and said amplifiers comprising at least two cascaded transistors being directly coupled together with the output of the preceding transistor controlling the conduction of the succeeding transistor, and means coupling the output of the said two of said transistors to commonly apply power impulses to the motor, whereby said last succeeding transistor is regulated by its preceding transistor but has its output in parallel with that of the preceding transistor.

6. The constant speed device of claim 5, including line voltage transient suppression means interconnecting the output of said square waveshape signal producing means to ground when direct voltage surges above a predetermined level occur and simultaneously disrupting transmission of power impulses to the motor windings.

7. A constant speed direct current drive for alternating current motors having a pair of windings adapted to be energized in an out-of-phase relationship, comprising:
   means energizable by a direct current source for producing two series of square waveshape signals in alternation,
   a direct current amplifier means interconnected to receive said two series of signals to produce two alternate series of direct current power impulses at a frequency controlled by the two series of signals,
   means coupling each series of direct current power impulses to energize the motor windings in an opposite direction from the other series,
   said coupling means further including a transient isolating circuit interconnecting said series of direct current power impulses and said motor windings to prevent undesired transients from energizing the motor windings, and
   line voltage transient suppression means interconnecting the output of said square waveshape signal producing means to ground when voltage surges above a predetermined level occur and simultaneously disrupting transmission of power impulses to the motor windings.

8. In a constant speed motor control system for alternating current motors and energizable by a direct current source,
   a constant frequency oscillator stage that is substantially insensitive to variations in the amplitude of the direct current source and variations in temperature,
   a flip-flop stage,
   a buffer isolating amplifier interconnecting said oscillator to said flip-flop stage to drive the latter,
   a transient frequency by-pass circuit being included in said buffer amplifier stage to prevent switching transients from said flip-flop stage from effecting the constant frequency of the oscillator stage,
   a pair of direct current amplifiers connected to be energized in alternation by said flip-flop stage to produce two series of alternate direct current power impulses, each amplifier includnig a pair of transistors being interconnected whereby conduction of one of the transistors energizes the second in conduction,
   a pair of current limiting networks including a resistor and a voltage regulating Zener diode connected in circuit between the flip-flop stage and each of the direct current amplifier stages,
   a transient by-pass circuit interconnecting the output of both of the amplifiers to by-pass undesired transient voltages, and means interconnecting said transistors to jointly apply direct current impulses, in opposition, to energize said alternating current motor.

9. The constant speed motor control system of claim 8 wherein said transistor pairs are compound connected with the output of the preceding transistor controlling the conduction of the succeeding transistor, whereby said last named transistor is regulated by its preceding transistor but has its output in parallel with that of the preceding transistor.

10. The constant speed motor control system of claim 9 including means for degeneratively biasing said transistors for compensation against variations in leakage current at elevated temperatures.

11. The device of claim 9 including line voltage transient suppression means interconnecting the output of said square waveshape signal producing means to ground when voltage surges above a predetermined level occur and simultaneously disrupting transmission of power impulses to the motor windings.

12. A constant speed direct current drive for alternating current motors having a pair of windings adapted to be energized in an out-of-phase relationship comprising:
an oscillator energizable by a direct current source and producing a constant frequency signal,
means connected to receive the constant frequency signal for producing two series of square waveshape signals in alternation,
a transient isolating circuit interconnecting the oscillator and the square waveshape signal producing means to prevent transients produced by the square waveshape circuit from being coupled backwardly to the oscillator,
a direct current amplifier means connected to receive the said two series of signals to produce two alternate series of direct current power impulses at a frequency controlled by the two series of signals,
and means coupling each series of direct current power impulses to energize the motor windings in an opposite direction from the other series.

13. A constant speed direct current drive for alternating current motors having a pair of windings adapted to be energized in an out-of-phase relationship comprising:
an oscillator energizable by a direct current source and producing a constant frequency signal,
means connected to receive the constant frequency signal for producing two series of square waveshape signals in alternation,
a direct current amplifier means connected to receive the said two series of signals to produce two alternate series of direct current power impulses at a frequency controlled by the two series of signals,
a decoupling circuit interconnecting the square waveshape signal producing means and the direct current amplifier means to prevent transmission of spurious voltages appearing at the output of the former means,
and means coupling each series of direct current power impulses to energize the motor windings in an opposite direction from the other series.

14. A constant speed direct current drive for alternating current motors having a pair of windings adapted to be energized in an out-of-phase relationship comprising:
an oscillator energizable by a direct current source and producing a constant frequency signal,
means connected to receive the constant frequency signal for producing two series of square waveshape signals in alternation,
a direct current amplifier means connected to receive the said two series of signals to produce two alternate series of direct current power impulses at a frequency controlled by the two series of signals,
said coupling means including a transient isolating circuit interconnecting said series of direct current power impulses and said motor windings to prevent undesired transients from energizing the motor windings.

15. A constant speed direct current drive for alternating current motors having a pair of windings adapted to be energized in an out-of-phase relationship comprising:
an oscillator energizable by a direct current source and producing a constant frequency signal,
means responsive to the constant frequency signal for producing two series of square waveshape signals in alternation,
line voltage transient suppression means interconnecting the output of said square waveshape signal producing means to ground when direct voltage surges above a predetermined level occur and simultaneously disrupting transmission of power impulses to the motor windings,
a direct current amplifier means connected to receive the said two series of signals to produce two alternate series of direct current power impulses at a frequency controlled by the two series of signals,
and means coupling each series of direct current power impulses to energize one of said motor windings in an opposite direction from the other series.

16. The device of claim 13 wherein said coupling means includes a transient isolating circuit interconnecting said series of direct current power impulses and said motor windings.

17. The device of claim 16 including line voltage transient suppression means interconnecting the output of said square waveshape signal producing means to ground when direct voltage surges above a predetermined level occur and simultaneously disrupting transmission of power impulses to the motor windings.

18. The device of claim 14 including line voltage transient suppression means interconnecting the output of said square waveshape signal producing means to ground when direct voltage surges above a predetermined level occur and simultaneously disrupting transmission of power impulses to the motor windings.

References Cited

UNITED STATES PATENTS

| | | | |
|---|---|---|---|
| 3,105,180 | 9/1963 | Burnett | 318—341 |
| 3,117,268 | 1/1964 | Madsen | 318—341 |
| 3,171,075 | 2/1965 | Kirk | 318—254 |

ORIS L. RADER, *Primary Examiner.*

J. J. BAKER, *Assistant Examiner.*